(12) United States Patent
Mori et al.

(10) Patent No.: US 6,795,324 B2
(45) Date of Patent: Sep. 21, 2004

(54) POWER CONVERTER

(75) Inventors: Kazuhisa Mori, Hitachi (JP); Takashi Ikimi, Hitachi (JP); Satoshi Fukuda, Hitachinaka (JP); Takao Kishikawa, Hitachinaka (JP); Tomoharu Sakoda, Hitachinaka (JP)

(73) Assignees: Hitachi, Ltd., Tokyo (JP); Hitachi Building Systems Co., Ltd., Tokyo (JP)

( * ) Notice: Subject to any disclaimer, the term of this patent is extended or adjusted under 35 U.S.C. 154(b) by 27 days.

(21) Appl. No.: 10/099,954

(22) Filed: Mar. 19, 2002

(65) Prior Publication Data

US 2003/0002311 A1 Jan. 2, 2003

(30) Foreign Application Priority Data

Jul. 2, 2001 (JP) .................................... 2001-200289

(51) Int. Cl.$^7$ .............................................. H02M 1/00
(52) U.S. Cl. .................. 363/144; 257/691; 257/724; 307/147; 307/148
(58) Field of Search ........................ 257/691, 723, 257/724, 773, 776, 925; 307/130, 131, 147, 148, 150; 363/17, 98, 132, 136–138, 144, 147; 361/826; 174/72 A, 255

(56) References Cited

U.S. PATENT DOCUMENTS

| 6,064,578 | A | * | 5/2000 | Hashimoto et al. ........... 363/16 |
| 6,259,616 | B1 | * | 7/2001 | Ekwall et al. ............... 363/132 |
| 6,384,492 | B1 | * | 5/2002 | Iversen et al. ............... 307/147 |
| 6,462,976 | B1 | * | 10/2002 | Olejniczak et al. ......... 363/147 |

* cited by examiner

Primary Examiner—Michael Sherry
Assistant Examiner—Gary L. Laxton
(74) Attorney, Agent, or Firm—Antonelli, Terry, Stout & Kraus, LLP (57) ABSTRACT

A power converter is disclosed, in which the sum of the length of that portion of a control signal line which is in opposite relation to an area of a main circuit wiring where a main circuit current flows and a plurality of tabular conductors are in superposed relation with each other, the length of that portion of the control signal line which is in opposite relation to an area of the main circuit wiring where the main circuit current does not flow and the length of that portion of the control signal line which is located outside an end of the main circuit wiring, is substantially equal to the total wiring length of the signal control line.

18 Claims, 7 Drawing Sheets

FIG. 1A FIG. 1B

FRONT VIEW — CONNECTED TO SMOOTHING CAPACITOR

SIDE VIEW

TO EMITTER OF 1A
TO EMITTER OF 1B
60
TO COLLECTOR OF 2A
TO COLLECTOR OF 2B
50
INTERMEDIATE CONDUCTOR

TO EMITTER OF 2A
TO EMITTER OF 2B
40
CONNECTED TO NEGATIVE ELECTRODE OF SMOOTHING CAPACITOR
NEGATIVE CONDUCTOR

TO COLLECTOR OF 1A
TO COLLECTOR OF 1B
30
CONNECTED TO POSITIVE ELECTRODE OF SMOOTHING CAPACITOR
POSITIVE CONDUCTOR

ONE PHASE

FRONT VIEW    CONNECTED TO SMOOTHING CAPACITOR    SIDE VIEW

FIG. 8A — TOP PLAN VIEW

FIG. 8B — SIDE VIEW

CONNECTED TO SMOOTHING CAPACITOR

FIG. 9

POWER CONVERTER

BACKGROUND OF THE INVENTION

The present invention relates to a power converter using at least a semiconductor switching device.

In recent years, a power converter comprising a high-speed semiconductor switching device such as an insulated gate bipolar transistor (IGBT) has come to find wide applications. A large-capacity power converter, due to a large conduction current thereof, employs a large-capacity semiconductor switching device, sometimes in a set of several units in series or in parallel. In order to suppress the surge voltage at the time of switching, the inductance of the main circuit wiring is required to be reduced. For this purpose, the length of the conductor is decreased as far as possible or the width of the conductor is increased as far as possible using a tabular conductor. Further, an insulating material is often held between wide thin-plate conductors as a laminate conductor.

In a drive circuit for generating a control signal to control the on-off operation of the semiconductor switching device using an IGBT, for example, a predetermined voltage is applied between gate and emitter for the turn-on operation and a voltage is removed or a reverse voltage is applied for the turn-off operation. The gate-emitter voltage is controlled by performing the charge/discharge operation between gate and emitter through a gate resistor from a power supply included in the gate driver circuit. In the case where the gate wiring is located in the neighborhood of a main circuit conductor, the switching operation is affected by the magnetic field fluctuations due to the change in the main circuit current, with the result that a current imbalance between the switching elements connected in parallel or a malfunction is caused, sometimes leading to the breakage of the semiconductor switching device.

In the power converter disclosed in JP-A-9-261948, for example, the gate wirings of two IGBTs connected in parallel are arranged adjacently to the respective main circuit wiring to make a uniform effect that the current flowing in the main circuit conductor has on the gate wirings and thereby to suppress the imbalance between the IGBTs in parallel.

In the semiconductor stack described in JP-A-7-170723, on the other hand, a gate resistor is mounted on the bent portion of an end of each insulating plate making up a laminate conductor. In this way, the area of the loop formed by the gate wiring is reduced to alleviate the effect of the main circuit current.

In the former example, the use of a main circuit wiring made up of a tabular conductor to reduce the inductance of the main circuit wiring makes it difficult to form a structure in which the gate wirings are affected uniformly by each of the elements connected in parallel. As long as the IGBT module has a structure symmetric about a line, this requirement can be met by arranging the gate wiring at symmetric positions. Nevertheless, the IGBT module terminals are often asymmetric, and a structure symmetric about a line is difficult to construct. As a result, it is difficult for the gate wirings to be uniformly affected, resulting in an unbalanced current.

The latter example, on the other hand, requires the step of bending an insulating plate, which makes the fabrication difficult probably with an increased cost. Also, in the case where a main circuit wiring formed of a tabular conductor is used to reduce the inductance of the main circuit, the gate terminals of the IGBT may enter the wiring area of the main circuit. In such a case, the gate wiring are affected by the main circuit current.

SUMMARY OF THE INVENTION

The object of the present invention is to provide a power converter, comprising a main circuit wiring including a tabular conductor, that can reduce the effect of the main circuit current on the control signal wiring.

One means for solving the aforementioned problem is described below.

The control signal line for supplying a control signal to the control terminal of a semiconductor switching device includes the following portions defined based on the positional relation with the main circuit wiring and the main circuit current. They are that portion of the control signal line which is in opposite relation to an area of the main circuit wiring where a main circuit current flows and a plurality of tabular conductors are in superposed relation to each other, that portion of the control signal line which is in opposite relation to an area of the main circuit wiring where no main circuit current flows, and that portion of the control signal line located outside an end of the main circuit wiring. The sum of the lengths of the wiring of these portions is rendered substantially equal to the total wiring length of the control signal line.

The aforementioned means can suppress the effect of the main circuit current on substantially the whole control signal wiring. As a result, the malfunction of the semiconductor switching device can be prevented. Also, in the case where a plurality of semiconductor switching devices are electrically connected to each other, the imbalance of the control signals and the shift of the switch timing among the semiconductor switching devices can be prevented.

Another means for solving the problem is described below.

In the case where the control signal line passes in the vicinity of an end portion of the main circuit wiring, i.e. in the case where the control signal line crosses an end of the area of the main circuit wiring where the main circuit current flows, between the side of the main circuit wiring where a semiconductor switching device is located and the opposite side thereof, an arrangement is made so that the control signal line crosses an end of the area of the main circuit wiring where a plurality of tabular conductors are in superposed relation with each other.

As a result, even at a place in the vicinity of an end portion of a tabular conductor of the main circuit wiring which is otherwise easily affected by the main circuit current, the effect of the main circuit current on the control signal line is relaxed and the malfunction of the semiconductor switching device can be prevented.

Each means described above is applicable to various power converters including the inverter, converter, semiconductor valve and various switching power supplies.

Also, various semiconductor devices can be employed as a semiconductor switching device, such as the IGBT, MOSFET (metal oxide field effect transistor), GTO (gate turn off thyristor) and a switching module including any of these devices and other electric or electronic devices accommodated in a container.

According to this invention, there can be realized a highly reliable power converter using a main circuit wiring including a tabular conductor, which can operate in stable fashion while suppressing the effect of the main circuit current on the control signal.

BRIEF DESCRIPTION OF THE DRAWINGS

FIGS. 3A to 3F show a semiconductor circuit according to the first embodiment of the invention, in which FIGS. 3B, 3D and 3F are sectional views of the members of the semiconductor circuit shown in FIGS. 3A, 3C and 3E, respectively.

DESCRIPTION OF THE EMBODIMENTS

Embodiments of the invention will be explained below with reference to the drawings. These embodiments refer to a case employing a switching module having built therein an IGBT making up a semiconductor switching element and a freewheeling diode connected in antiparallel to the IGBT. Nevertheless, other switching elements than the IGBT can be used with equal effect.

Figure 4:
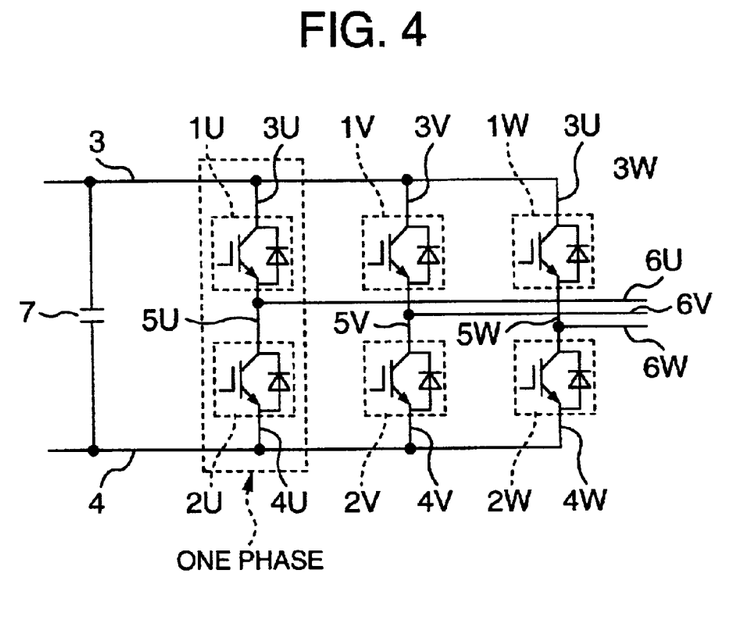
FIG. 4 shows a semiconductor circuit according to the first embodiment.

FIG. 4 shows a semiconductor circuit of an inverter portion of a three-phase power converter according to a first embodiment of the invention. This circuit supplies the desired three-phase power to AC output terminals 6U to 6W by turning on/off switching modules 1U to 2W with a smoothing capacitor 7 as a DC power supply. A positive-side tabular conductor 3 connected to the positive electrode of the smoothing capacitor 7 is connected to the positive terminals of the positive-side switching modules 1U to 1W of the respective phases through conductors 3U to 3W, respectively. In each phase, the negative terminals of the positive-side switching modules 1U to 1W, the positive terminals of the negative-side switching modules 2U to 2W and the AC output terminals 6U to 6W are connected to each other by intermediate tabular conductors 5U to 5W, respectively. The negative terminals of the negative-side switching modules 2U to 2W of each phase are connected to the negative terminal of the smoothing capacitor 7 through the negative-side tabular conductors 4U to 4W, respectively. In FIG. 4, the gate circuit for driving each switching module is not shown. Neither a snubber circuit connected as required is shown.

In the power converter shown in FIG. 4, a plurality of switching modules including the corresponding ones of the modules 1U to 2W are connected in parallel for each phase in order to increase the current involved.

Figure 5:
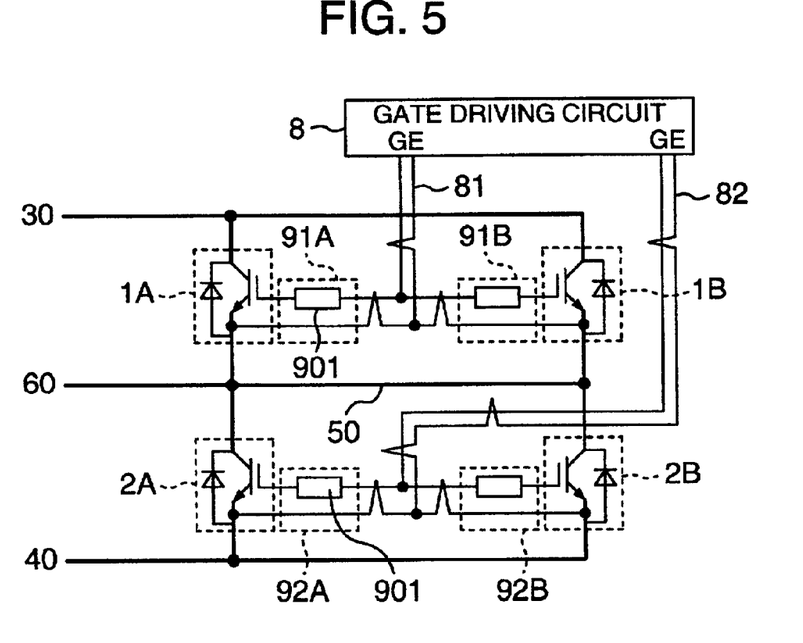
FIG. 5 shows two switching modules connected in parallel each other according to the first embodiment of the invention.

FIG. 5 shows a circuit corresponding to the circuit of FIG. 4, in which two switching modules are connected in parallel for each phase. The positive-side switching modules 1A and 1B are connected in parallel to each other, and so are the negative-side switching modules 2A and 2B. A positive-side tabular conductor 30, a negative-side tabular conductor 40 and an AC output tabular conductor 60, though shown to the left in FIG. 5, are mounted in such a manner as to assure a uniform inductance of the switching modules connected in parallel. The positive-side switching modules 1A and 1B are driven by a common gate drive circuit board 8 through gate resistors 901 and gate wirings 81 mounted on the gate resistor boards 91A and 91B, respectively. Similarly, the negative-side switching modules 2A and 2B are driven by the common gate drive circuit 8 through gate resistors 901 and gate wirings 82 mounted on the gate resistor boards 92A and 92B, respectively. Although the gates of the positive-side switching modules 1A, 1B and the gates of the negative-side switching modules 2A, 2B are shown to be driven by the common gate drive circuit board 8, the circuits are independent of each other. Separate boards can also be used. The switching modules connected in parallel, however, employ a common gate drive circuit, since individual differences of the gate drive circuits develop an imbalance.

Figure 6:
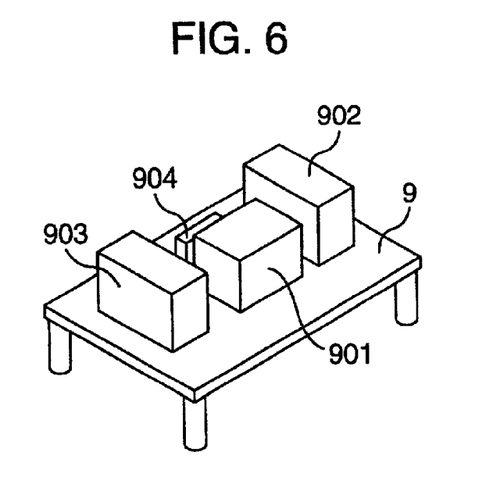
FIG. 6 shows a general structure of a gate resistance board.

FIG. 6 shows a general structure of the gate resistor boards 91A to 92B. Specifically, a gate resistor 901 and wiring connectors 902, 903 are mounted on a printed board 9. The efficiency of the wiring work can be improved by use of a removable connector for connecting the gate wirings and the printed board. A simplest example of the gate resistor 901 is shown. Alternatively, a plurality of gate resistors may be employed in accordance with the capacity, or if required, the gate resistor 901 can be combined with a diode to change the resistance value of the gate circuit by turning on/off. The IGBT is liable to be broken if a voltage exceeding a predetermined level (generally, about 20 V) is applied to the gate terminal and the emitter terminal. To suppress an overvoltage, therefore, a zener diode 904 is mounted on the gate resistor board 9.

Figures 1A, 1B:
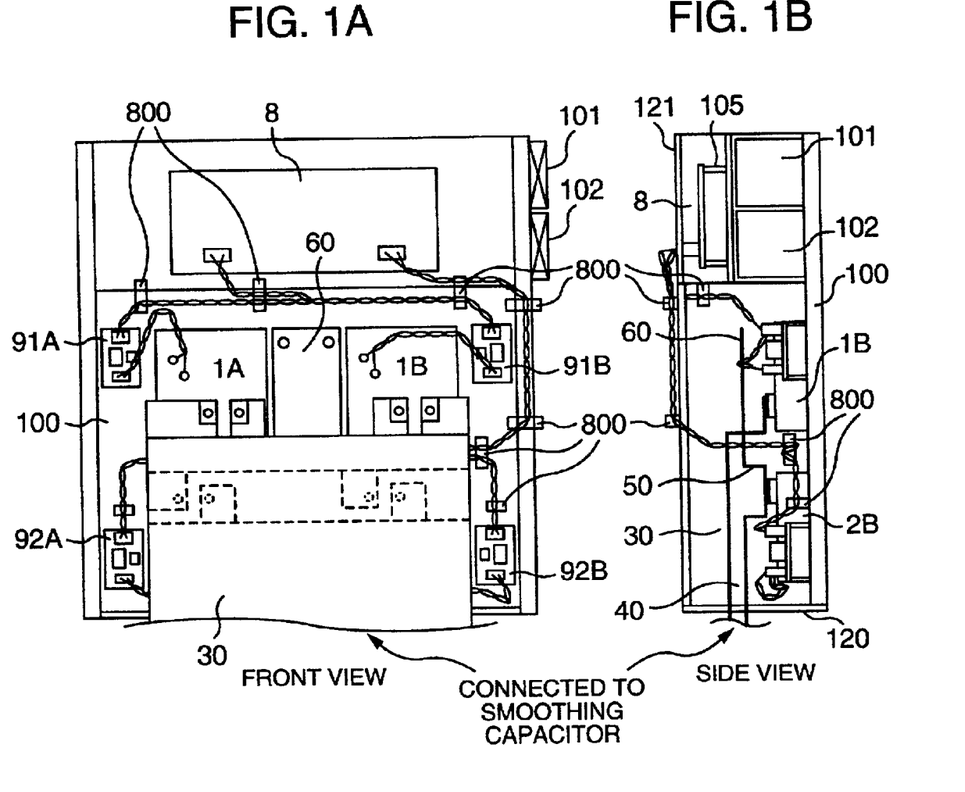
FIGS. 1A and 1B show a mounting structure according to a first embodiment of the invention.

FIGS. 1A and 1B show a mounting structure of the circuit configuration shown in FIG. 5. In this case, the detailed construction of the terminals and the connectors and screws are abbreviated or not shown. In FIGS. 1A and 1B, four IGBT modules 1A to 2B are mounted on a heat sink 100. This embodiment employs a heat sink of heat pipe type, in which the heat generated in the IGBT modules is transported upward by the pipes in the heat sink 100 and cooled by cooling fans 101, 102 of a radiation unit. The heat sink 100 is set in a vertical position, and a smoothing capacitor, not shown, is arranged thereunder. The heat sink 100 and the cooling fans 101, 102 are supported by support members 120, 121. Although the cooling fans are shown only on one side (right side in the shown case), provision of additional fans on the opposite side (left side in the shown case) can improve the cooling performance.

The gate drive circuit 8 is arranged at a position not in superposed relation with the IGBT modules 1A to 2B and the tabular conductors 30, 40, 50, 60 (in the drawing) making up the main circuit wirings, and mounted on a support member 105. The arrangement of the gate drive circuit 8 at a distance from the main circuit wirings can suppress the effects such as the induction caused by the main circuit current on the one hand and the temperature increase which otherwise might be caused by the heat generated in the IGBT modules on the other hand. FIGS. 1A and 1B show that the gate drive circuit 8 is located above the IGBT modules which generate heat. Due to the cooling effect of the fans 101, 102, however, the temperature rise in the neighborhood of the gate drive circuit 8 by convection can be reduced.

The collector terminals of the positive-side IGBT modules 1A and 1B are connected with the positive-side tabular conductor 30. The emitter terminals of the positive-side IGBT modules 1A, 1B are connected with the collector terminals of the negative-side IGBT modules 2A, 2B through the intermediate tabular conductor 50. The intermediate tabular conductor 50 is integrated with the AC output tabular conductor 60. As shown in FIGS. 3A to 3F, the positive-side tabular conductor 30, the intermediate tabular conductor 50 and the negative-side tabular conductor 40 are separated from each other. Nevertheless, they can be configured as a laminate conductor making up an integrated structure through an insulating material. In FIGS. 1A and 1B, the insulating plate between the conductors is not shown. The surge voltage at the time of switching the IGBT modules is affected by the inductance of a loop circuit configured of the positive- and negative-side IGBTs and the smoothing capacitor 7 not shown. A current flows in vertical direction in FIGS. 1A, 1B. This current constitutes a reciprocating current between the negative-side tabular conductor 40 and the intermediate tabular conductor 50 located in the vicinity of the IGBT modules on the one hand and the positive-side tabular conductor 30 covered on the conductors 40, 50 on the other hand, thereby reducing the inductance. In FIGS. 1A, 1B, the large width covering the IGBT modules 2A, 2B reduces the inductance further.

The gate resistance boards 91A to 92B are arranged adjacently to the IGBT modules 1A to 2B, respectively, at positions not in superposed relation with the main circuit wirings configured of the tabular conductors 30, 40, 50 and 60. As a result, the wirings 812A to 822B between the gate resistors 901 (FIG. 6) and the IGBT modules 1A to 2B are not extremely long. Also, the connectors 902, 903 (FIG. 6) of the gate resistance boards do not interfere with the tabular conductors of the main circuit wirings, and therefore the gate wirings can be connected easily. Further, in view of the fact that the gate resistors are connected at portions nearer to the IGBT modules than to the diverging points of the gate wirings, the induction current which otherwise might give rise to the unbalance between the parallel circuits is reduced. The shown position of the gate resistor boards 91A to 92B is only an example, and, though not shown, the resistor boards 91A to 92B can be mounted at any other position where bolts for mounting them are out of contact with the heat pipe in the heat sink. Also, the gate resistor boards 91A to 92B, which are mounted on the heat sink 100 in this embodiment, can alternatively be mounted on the support member 105 or 120, 121.

As understood from FIGS. 1A, 1B, no parts are arranged on the surface of the main circuit wirings configured of the tabular conductors 30, 40, 50, 60, and therefore the work of mounting/demounting the conductors can be carried out easily.

The control signal lines (gate wirings) for driving the gates will be explained with reference to FIG. 2.

Figure 2:
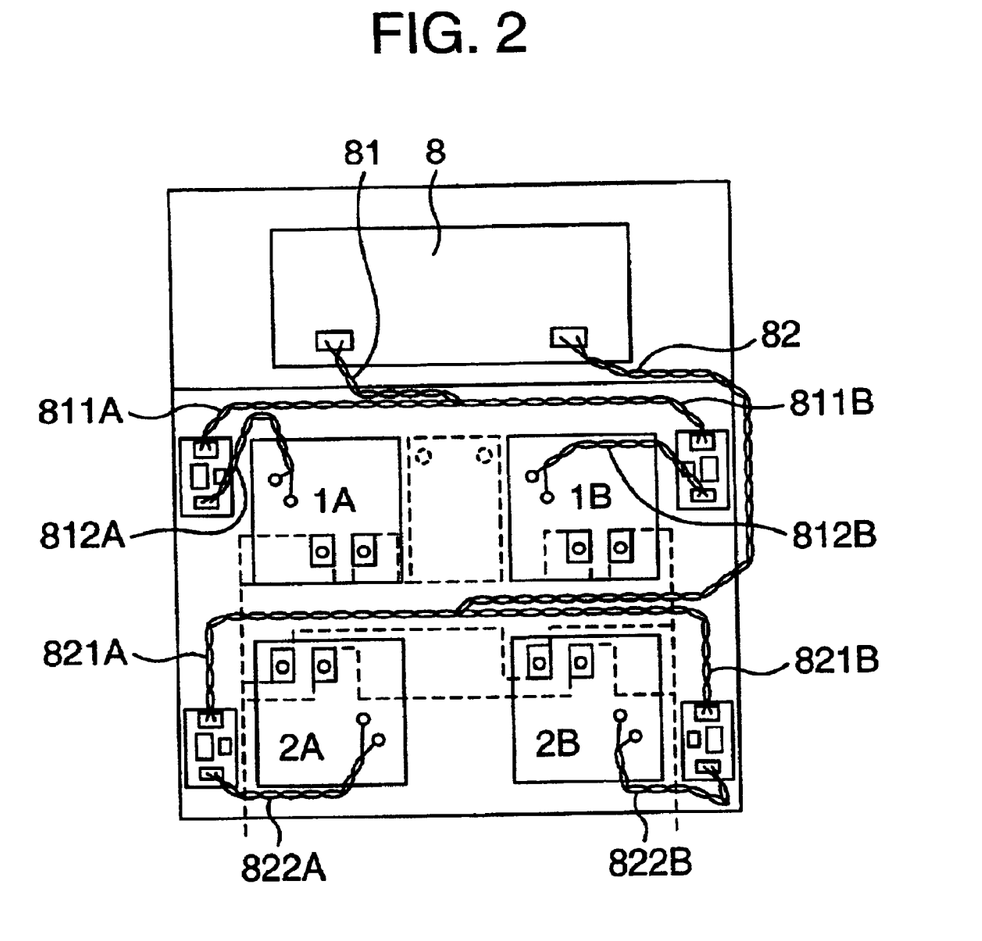
FIG. 2 is a diagram for explaining a gate wiring according to the first embodiment of the invention.
Figures 3A, 3B:
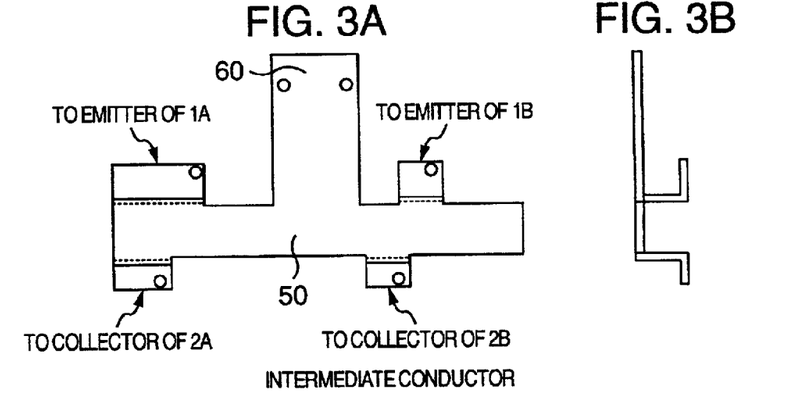
Figure 3C:
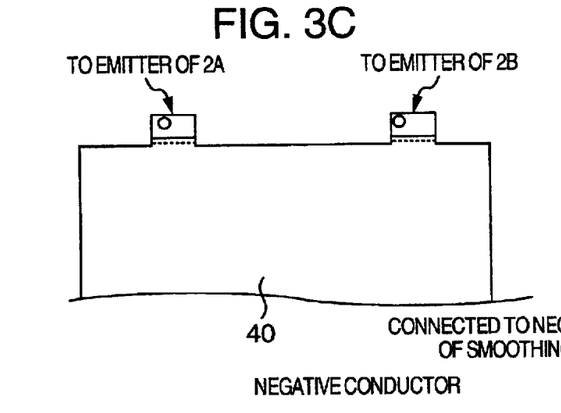
Figure 3D:
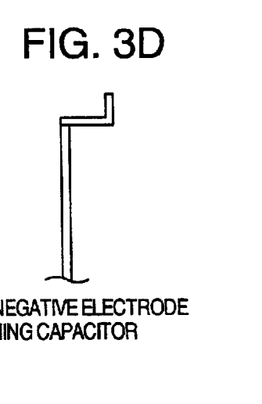
Figure 3E:
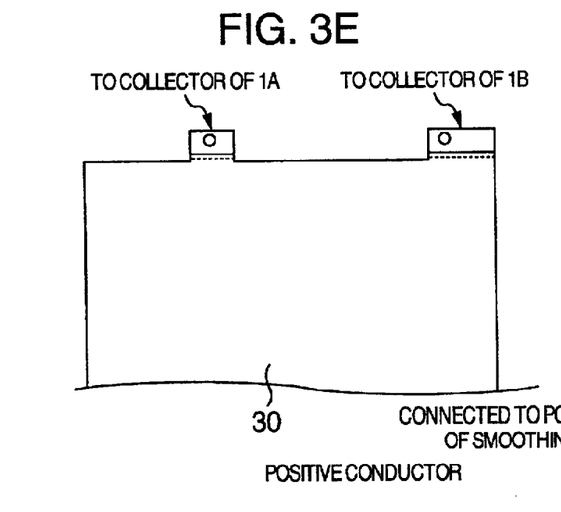
Figure 3F:
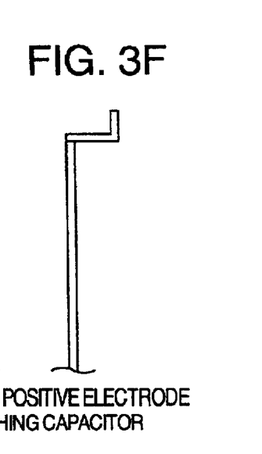

FIG. 2 shows the state in which the conductors shown by dashed lines are removed in the configuration of FIGS. 1A, 1B. The support members 120, 121 and the cooling fans 101, 102 are not shown either. The gate wiring 81 connected to the gate drive circuit 8 branches midway into wirings 811A and 811B, each connected to one of the connectors of each of the gate resistor boards 91A and 91B, respectively. The gate wirings 812A and 812B connected to the other connector of each of the gate resistor boards 91A and 91B are connected to the gate terminals of the IGBT modules 1A and 1B, respectively. The gate wirings 811A and 811B have substantially the same length, and hence, substantially the same impedance. This is also the case with the gate wirings 812A and 812B which have substantially the same length, and hence substantially the same impedance. The diverging point of the gate wiring 81 where it branches into the wirings 811A and 811B can be actually formed by pressure bonding or soldering. In similar fashion, the gate wiring 82 connected to the gate drive circuit 8 branches into gate wirings 821A and 821B, which are connected to gate wirings 822A and 822B, respectively, through the gate resistor boards 92A and 92B, and then further to the gate terminals of the IGBT modules 2A and 2B.

In FIGS. 1A, 1B and 2, the gate wirings on the gate and emitter sides are twisted to suppress the induction by the main circuit current. Also, the gate wirings 811A, 811B, 812A and 812B for driving the positive-side IGBT modules 1A, 1B are laid at positions distant from the tabular conductors 30, 40 and 50 thereby to reduce the effect of the main circuit current. Specifically, the entire length of the gate wirings (the set of the gate wirings 811A, 812A and the set of the gate wirings 811B, 812B) for supplying the gate terminals of the IGBT modules 1A, 1B with the gate control signal generated in the gate drive circuit 8, is located outside the outer peripheral end portion of the main circuit wiring having the tabular conductors 30 to 60. More specifically, the gate wirings 811A, 812A, 811B, 812B are distant from the area of the main circuit wiring where the main circuit current flows. As a result, the gate wirings 811A, 812A, 811B, 812B are hardly affected by the main circuit current, so that the gate control signal to the IGBT modules 1A, 1B is prevented from being unbalanced.

On the other hand, the gate terminals of the negative-side IGBT modules 2A, 2B are covered by the negative-side tabular conductor 40 and the positive-side tabular conductor 30, respectively. The gate wirings 822A, 822B are arranged in an area of the negative-side tabular conductor 40 nearer to the IGBT modules where the negative-side tabular conductors 40 and the positive-side tabular conductor 30 are in superposed relation with each other at a short distance from each other. Specifically, the gate wirings 822A, 822B have a portion opposite to an area where the tabular conductor 40 and the tabular conductor 30 are in superposed relation with each other. In view of the fact that a reciprocating current flows in the area where the conductors 40 and 30 are in superposed relation with each other, the magnetic field extending outside is offset. Thus, the gate wirings 822A, 822B are less affected by the main circuit current. Also, the gate wiring 82 connected to the gate drive circuit 8 branches into the gate wiring 821A connected to the gate resistance board 92A and the gate wiring 821B connected to the gate resistance board 92B, which cross an area in superposed relation with the main circuit wiring. These gate wirings 821A, 821B, as shown in FIG. 2, have a portion opposite to an area where the intermediate tabular conductor 50 and the positive-side tabular conductor 30 are in superposed relation with each other. The gate wirings 821A, 821B are thus arranged between this area and the surface of the heat sink.

The gate wirings 821A, 821B, 822A, 822B leading from the gate drive circuit 8 to the gate terminals of the IGBT modules 2A, 2B, as described above, each have a portion opposite to an area where the tabular conductors are in superposed relation with each other. The portions of the gate wirings in the vicinity of the gate resistance boards 92A, 92B, however, are located at a position distant from the conductors, i.e. outside the outer peripheral end of the main circuit wiring. Therefore, the total length of each gate wiring (the set of the gate wirings 821A, 821B and the set of the gate wirings 822A, 822B) is represented by the sum of the length of a portion in opposite relation to an area of the main circuit wiring where the tabular conductors are in superposed relation with each other and the reciprocating current flows and the length of a portion located outside the end of the main circuit wiring at a distance from the main circuit current. As a result, like in the IGBT modules 1A, 1B, the gate control signal to the IGBT modules 2A, 2B is prevented from becoming unbalanced by the effect of the main circuit current.

In the case where the sum of the length of the portion of the gate wiring in opposite relation to an area of the main circuit wiring where the main circuit current flows and a plurality of tabular conductors are in superposed relation with each other and the length of the portion of the gate wiring located outside an end of the main circuit wiring represents at least 60% or preferably at least 80% of the total length of the gate wiring, the imbalance of the gate control signal can be prevented in the same manner as if the sum of the length of the two portions substantially represents the total length of the gate wiring.

According to this embodiment, the whole length of the gate wiring from the gate drive circuit 8 to the diverging point of the gate wiring is also represented by the sum of the length of the portion opposite to an area where the tabular conductors are in superposed relation with each other and the length of the portion located outside an end of the main circuit wiring. Therefore, the gate control signal is prevented from receiving a noise and causing a switching error of the IGBTs under the effect of the main circuit current.

Even in the case where a part of the gate wiring (not more than 20 to 40% of the whole) is in opposite relation to only one tabular conductor of the main circuit wiring where the main circuit current flows, the effect of the main circuit current can be reduced by forming the gate wiring of a twisted wire or a shielded wire. The diverging point of the gate wiring and the junction with a circuit portion such as the gate terminal which are easily affected by the main circuit current, however, are desirably opposite to an area where the tabular conductors are in superposed relation with each other as described above.

According to this embodiment, the gate control signals of the IGBT modules (1A, 1B and 2A, 2B) connected in parallel to each other can be prevented from becoming unbalanced under the effect of the main circuit current. Thus, a uniform switching rate can be achieved for the IGBT modules connected in parallel, and therefore a large current can be switched. Also, the noise due to the effect of the main circuit current on the gate control signals of the IGBT modules (1A, 2A, and 1B, 2B) connected in series to each other can be suppressed, and therefore the switching operation at an erroneous timing can be prevented, thereby making it possible to avoid an abnormal operation such as the arm shorting. The number of parallel circuits or series circuits is not limited to two as in this embodiment, but may be three or more. According to this embodiment, a uniform parallel operation is attained, and the timing of the series operation is stable for one AC phase. Therefore, a highly reliable, large power inverter device can be realized. This embodiment is applicable to various power converters (converter, inverter, semiconductor valve, switching power supply, etc.) constituted of a semiconductor circuit including a serial-parallel circuit of semiconductor switching devices.

The gate wiring may have a portion opposite to an area of the main circuit wiring where no main circuit current flows. Such a portion is not affected by the main circuit current even if opposite to a tabular conductor. Also, the area where the tabular conductors are in superposed relation with each other is not limited to an area where the reciprocating current flows but may include an area where the main circuit current flows in one tabular conductor and no main current flows in the other tabular conductor which is floated or has a fixed potential (the ground potential, for example). This is by reason of the fact that the change in the main circuit current in one tabular conductor causes an induction current to flow in the other tabular conductor, resulting in the same effect of offsetting the external magnetic field as the reciprocating current. For this reason, the same effect as in the aforementioned embodiment can be achieved as long as the sum of the length of the portion of the gate wiring in opposite relation to an area of the main circuit wiring where the main circuit current flows and a plurality of tabular conductors are in superposed relation with each other, the length of the gate wiring portion in opposite relation to an area of the main circuit wiring where no main circuit current flows and the length of the gate wiring portion located outside an end of the main circuit wiring, is not less than 60 to 80% of the total gate wiring length, that is to say, substantially equal to the total gate wiring length.

A part of the gate wiring 82 extending from the gate drive circuit 8 to the diverging point of the gate wiring is laid in the range between the heat sink side and the opposite side to the conductors, and the part of the gate wiring 82 crosses at a portion of an area where the tabular conductors 30, 50 are in superposed and opposite relation with each other, in a boundary surface between the heat sink side and the opposite side. Specifically, between the side of the main circuit wiring where the IGBT modules are located and the opposite side (above the tabular conductors), the gate wiring crosses an end of the area of the main circuit wiring where the tabular conductors 30, 50 are in superposed relation with each other. As a result, the effect of the main circuit current on the gate wiring 82 can be suppressed. Also, the gate wiring 82 passes through an area distant from the conductor end, and therefore the effect of the main circuit current can be reduced further.

The gate wiring, if moved, develops a contact failure at the connectors or causes an induction current, and is fixed by a gate fixing tool 800 shown in FIGS. 1A, 1B at a position not in superposed relation with the main circuit wiring. The work of fixing the wiring, therefore, is easy, and the stacked conductors can be removed while keeping the gate wiring fixed. The shown fixing tool 800 can be located at other than the shown place, and the structure thereof is illustrated in simplistic fashion. Normally, a band or the like composed of an insulating material is used as a fixing tool.

FIGS. 3A to 3F show the shapes of the positive-side tabular conductor 30, the negative-side tabular conductor 40, the intermediate tabular conductor 50 and the AC output terminal 60. This example assumes an IGBT having a rated maximum voltage of 1200 V and a rated maximum current of 1000 A with a terminal structure shown in FIG. 2. The terminal positions of the IGBT modules are not symmetric. In the case where the modules are aligned as shown in FIG. 2, therefore, the tabular conductors are arranged asymmetrically as shown in FIGS. 3A to 3F. The share of the current at the time of switching is unbalanced if the inductance of each circuit connected in parallel lacks uniformity. With the conductor shape shown in FIGS. 3A to 3F, therefore, the IGBT 1A (left side) connector is thinner than the IGBT 1B (right side) connector at the terminal portion of the positive-side tabular conductor 30 connected with the IGBTs. Nevertheless, the inductance increases by only about 5%.

The IGBT module terminals 1A, 1B and 2A, 2B connected in parallel cannot be arranged symmetrically. Therefore, the positive-side tabular conductor 30, the negative-side tabular conductor 40, the intermediate tabular conductor 50 and the AC output terminal 60 are also asymmetric in shape. So are the gate wirings 812A, 812B and 822A, 822B. Once the terminals can be arranged symmetrically, however, the conductors and the gate wirings can also be laid symmetrically.

Figures 7A, 7B:
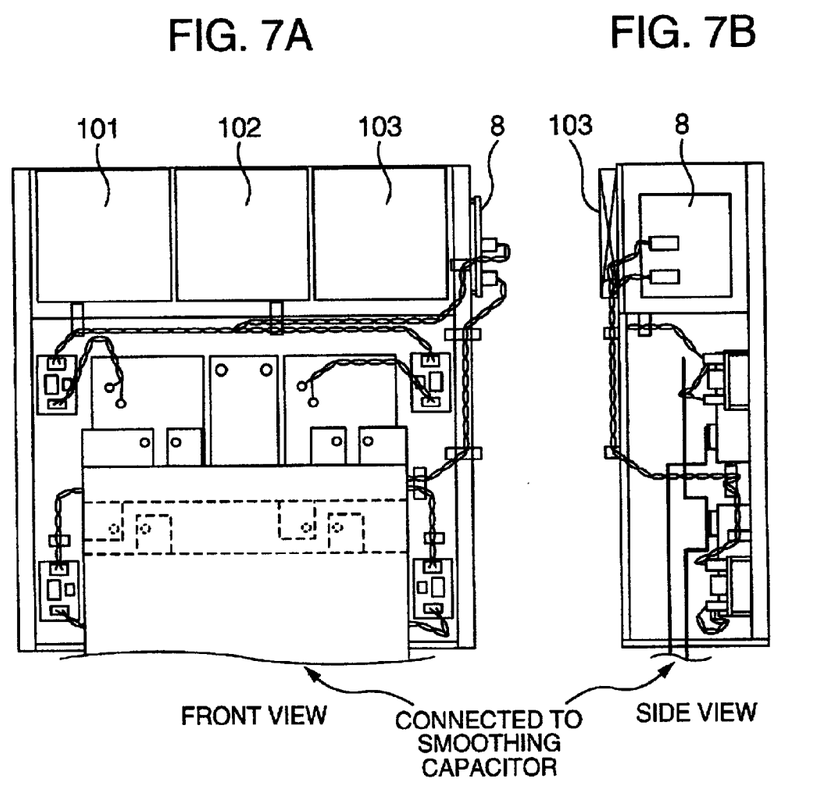
FIGS. 7A and 7B show a second embodiment of the invention.

A second embodiment of the invention is shown in FIGS. 7A, 7B and represents a case in which the gate drive circuit 8 and the fans 101, 102 are located at different positions than in FIGS. 1A, 1B. In FIGS. 1A, 1B, the air passing through the radiation unit of the heat sink is transverse in FIG. 1A, and perpendicular to the page in FIG. 1B. In FIGS. 7A, 7B, in contrast, the direction of air flow is perpendicular to the page in FIG. 7A, and transverse in FIG. 7B. Since the length of the radiation unit parallel to the air flow is short, the pressure loss is smaller for an improved cooling performance.

Figures 8A, 8B:
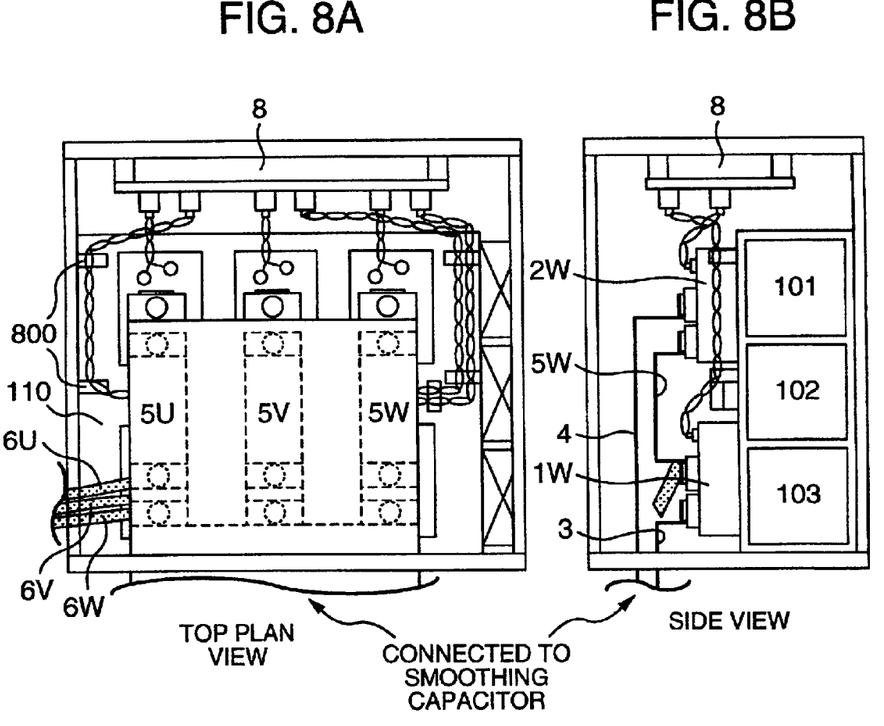
FIGS. 8A and 8B show a third embodiment of the invention.

A third embodiment of the invention is shown in FIGS. 8A, 8B. In a three-phase inverter constituting the embodiment shown in FIGS. 8A, 8B, positive-side IGBT modules 1U to 1W and the negative-side IGBT modules 2U to 2W are mounted on a heat sink 110. FIG. 8A is a top plan view, and FIG. 8B a side view of the inverter. In the shown case, the heat sink 110 is of forced air cooled type, and cooled by cooling fans 101 to 103 without using any refrigerant. The positive-side IGBT modules 1U to 1W are mounted at positions near to the smooth capacitor 7 not shown. Also in this case, the positive-side tabular conductor 3 and the negative-side tabular conductor 4 are stacked one on the other, and so are the intermediate tabular conductors 5U to 5W and the negative-side tabular conductor 4. The AC output terminals 6U to 6W, on the other hand, are led out by conductors from the emitter terminals of the positive-side IGBT modules.

Figure 9:
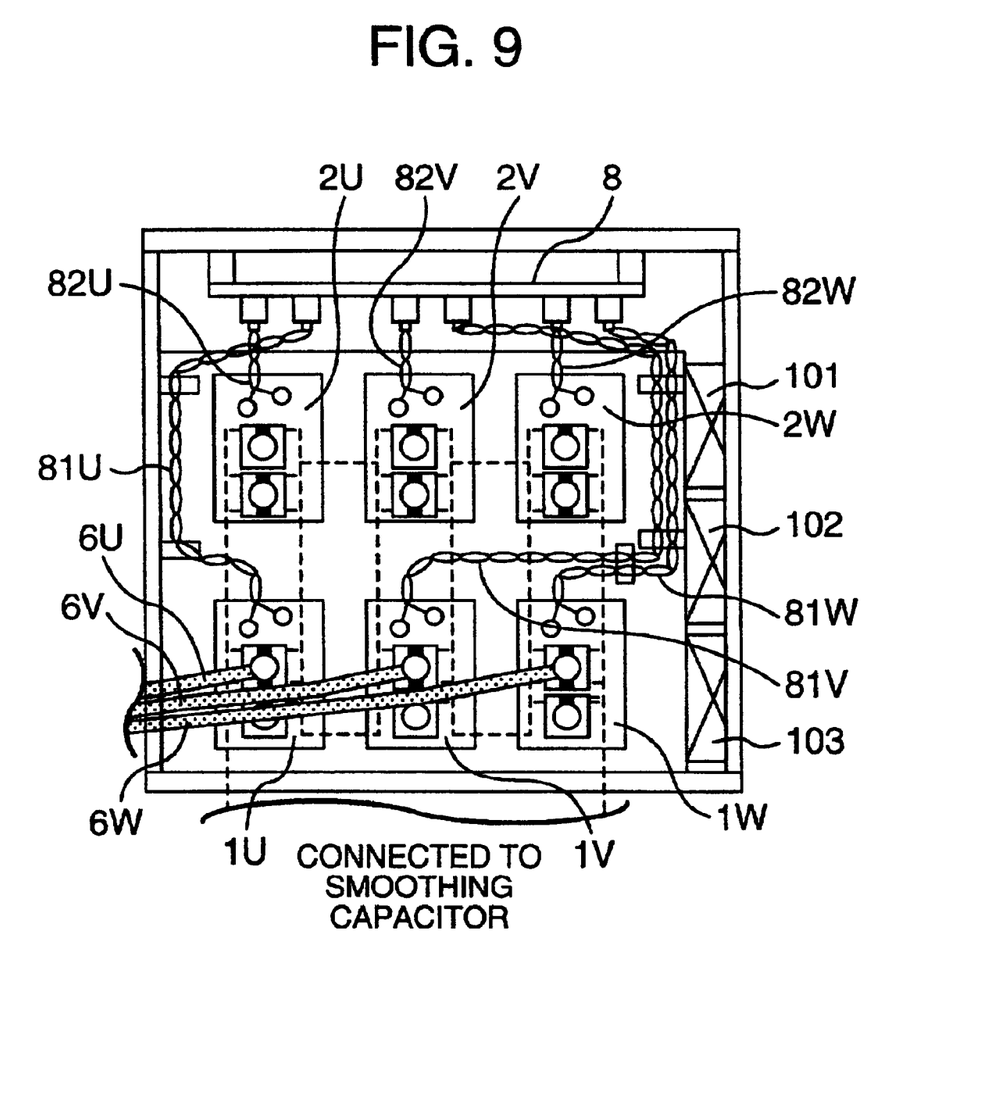
FIG. 9 shows a gate wiring mounting according to the third embodiment of the invention.

FIG. 9 is a perspective view, with the positive-side tabular conductor 3, the negative-side tabular conductor 4 and the intermediate tabular conductor 5 indicated by dashed lines, and with the gate wiring mounted in the structure of FIGS. 8A, 8B. The IGBT modules 1U to 2W are connected to the gate drive circuit 8 through the gate wirings 81U to 82W, respectively. Though not shown accurately in geometric fashion in FIGS. 8A, 8B and 9, the gate wirings are fixed on the heat sink 110 by the wire fixing means 800. In this case, the gate wirings 82U to 82W of the negative-side IGBT modules are laid at a distance from the main circuit wiring thereby to suppress the effect of the main circuit current. As to the positive-side IGBT modules, on the other hand, the IGBT module 1U is arranged under the portion where the intermediate tabular conductor 5U and the negative-side tabular conductor 4 are stacked. Similarly, the IGBT module 1W is arranged under the portion where the intermediate tabular conductor 5W and the negative-side tabular conductor 4 are stacked. The IGBT module 1V, on the other hand, is passed under the portion where no conductors are stacked, between the portion where the intermediate tabular conductor 5V and the negative-side tabular conductor 4 are in opposite relation to each other and the portion where the intermediate tabular conductor 5W and the negative-side tabular conductor 4 are in opposite relation to each other. However, while the main current flows vertically in FIG. 9, the gate wiring 82V is arranged transversely, thereby reducing the effect of the main circuit current.

In the embodiment shown in FIGS. 8A, 8B and 9, the whole length of the gate wirings 82U, 82V, 82W leading from the gate drive circuit 8 to the gate terminals of the IGBT modules 2U, 2V, 2W is located outside the outer peripheral end portion of the main circuit wiring including the tabular conductors 4, 5U, 5V, 5W. Specifically, in view of the fact that the gate wirings 82U, 82V, 82W are arranged at a distance from the area where the main circuit current flows, the noise due to the effect of the main circuit current is reduced. The total length of each of the gate wirings 81U, 81W extending from the gate drive circuit 8 to the IGBT modules 1U, 1W is represented by the sum of the length of the portion located outside an end of the main circuit wiring at a distance from the main circuit current, and the length of the portion in opposite relation to an area of the main circuit wiring where the tabular conductors 4, 5U, 5W are in superposed relation with each other and the reciprocating current flows. As a result, the gate wirings 81U, 81W are hardly affected by the main circuit current. At least 60 to 80% of the total length, i.e. substantially the total length of the gate wiring 81V is represented by the sum of the length of the portion located outside an end of the main circuit wiring at a distance from the main circuit current, the length of the portion in opposite relation to an area of the main circuit wiring where the tabular conductors 4 and 5V are in superposed relation with each other and the reciprocating current flows, and the length of the portion opposite to an area provided with only the tabular conductor 4. Thus, the noise that the gate control signal applied to the IGBT module 1V receives from the main circuit current is reduced. The portion representing 20 to 40% of the gate wiring 81V is in opposite relation to the area provided only with the tabular conductor 4 in which the main circuit current flows. Since the particular portion is twisted, however, the effect of the main circuit current flowing in the tabular conductor 4 on the gate wiring is relaxed.

According to the embodiment shown in FIGS. 8A, 8B, 9, the IGBT modules (1U, 2U; 1V, 2V; and 1W, 2W) connected in series for one phase are prevented from the erroneous switching operation caused by the main circuit current. Thus, the abnormal operation such as the arm shorting is prevented. Further, the gate control signal is not easily affected by the noise from the main circuit current, and therefore the switching operation of the IGBT modules at normal timing is maintained. As a result, the operation of the inverter as a whole is stabilized. As in the embodiments described above, the gate wiring may be composed of a shielded wire instead of a twisted wire. Also, this embodiment is applicable also to other power converters than the inverter with equal effect.

It should be further understood by those skilled in the art that the foregoing description has been made on embodiments of the invention and that various changes and modifications may be made in the invention without departing from the spirit of the invention and scope of the appended claims.

What is claimed is:

1. A power converter comprising:
    a semiconductor circuit including a first semiconductor device and a second semiconductor device each having a main terminal and a control terminal, and electrically connected to each other;
    a main circuit wiring including a plurality of tabular conductors arranged at least partially in superposed relation to each other, a main circuit current of said semiconductor circuit flowing in said main circuit wiring;
    a first control signal line for supplying a first control signal to said control terminal of said first semiconductor switching device; and
    a second control signal line for supplying a second control signal to said control terminal of said second semiconductor switching device;

wherein the sum of the length of that portion of each of said first control signal line and said second control signal line which is opposite to an area of said main circuit wiring where said main circuit current flows and where said plurality of said tabular conductors are in superposed relation to each other, the length of that portion of each of said first control signal line and said second control signal line in opposite relation to an area of said main circuit wiring where said main circuit current does not flow, and the length of that portion of each of said first control signal line and said second control signal line which is located outside an end of said main circuit wiring, is substantially equal to the total wiring length of each of said first control signal line and said second control signal line.

2. A power converter according to claim 1, wherein said first semiconductor switching device and said second semiconductor switching device are connected in parallel to each other.

3. A power converter according to claim 1, wherein said first semiconductor switching device and said second semiconductor switching device are connected in series to each other.

4. A power converter according to claim 1, wherein respective junction between each of said first and second control signal lines and the circuit portion of said semiconductor circuit is in opposite relation to selected one of an area of said main circuit wiring where said main circuit current flows and said plurality of said tabular conductors are in superposed relation with each other and an area of said main circuit wiring where said main circuit current does not flow, said junction being alternatively located outside an end of said main circuit wiring.

5. A power converter according to claim 2, wherein respective junction between each of said first and second control signal lines and the circuit portion of said semiconductor circuit is in opposite relation to selected one of an area of said main circuit wiring where said main circuit current flows and said plurality of said tabular conductors are in superposed relation with each other and an area of said main circuit wiring where said main circuit current does not flow, said junction being alternatively located outside an end of said main circuit wiring.

6. A power converter according to claim 3, wherein respective junction between each of said first and second control signal lines and the circuit portion of said semiconductor circuit is in opposite relation to selected one of an area of said main circuit wiring where said main circuit current flows and said plurality of said tabular conductors are in superposed relation with each other and an area of said main circuit wiring where said main circuit current does not flow, said junction being alternatively located outside an end of said main circuit wiring.

7. A power converter according to claim 1, wherein that portion of each of said first and second control signal lines which is in opposite relation to only one of said tabular conductors with said main circuit current flowing therein, is formed of selected one of a twisted wire and a shielded wire.

8. A power converter according to claim 2, wherein that portion of each of said first and second control signal lines which is in opposite relation to only one of said tabular conductors with said main circuit current flowing therein, is formed of selected one of a twisted wire and a shielded wire.

9. A power converter according to claim 3, wherein that portion of each of said first and second control signal lines which is in opposite relation to only one of said tabular conductors with said main circuit current flowing therein, is formed of selected one of a twisted wire and a shielded wire.

10. A power converter according to claim 2, wherein the length of that portion of each of said first and second control signal lines which is in opposite relation to an area of said main circuit wiring where said main circuit current flows and where said plurality of said tabular conductors are in superposed relation to each other, is substantially equal to the total length of the corresponding one of said first and second control signal lines.

11. A power converter according to claim 3,
wherein the length of that portion of said first control signal line which is in opposite relation to an area of said main circuit wiring where said main circuit current flows and said plurality of said tabular conductors are in superposed relation to each other, is substantially equal to the total length of said first control signal line, and wherein the sum of the length of that portion of said second control signal line which is in opposite relation to an area of said main circuit wiring where said main circuit current does not flow and the length of that portion of said second control signal line which is located outside an end of said main circuit wiring, is substantially equal to the total length of said second control signal line.

12. A power converter comprising:
a semiconductor circuit including a first semiconductor switching device and a second semiconductor switching device each having a main terminal and a control terminal, and electrically connected to each other;
a main circuit wiring including a plurality of tabular conductors arranged at least in partially superposed relation with each other, a main circuit current of said semiconductor circuit flowing in said main circuit wiring;
a first control signal line for supplying a first control signal to said control terminal of said first semiconductor switching device; and
a second control signal line for supplying a second control signal to said control terminal of said second semiconductor switching device;
wherein respective junction between each of said first and second control signal lines and the circuit portion of said semiconductor circuit is covered by selected one of an area of said main circuit wiring where said main circuit current flows and said plurality of said tabular conductors are in superposed relation to each other and an area of said main circuit wiring where said main circuit current does not flow; and
wherein that portion of each of said first and second control signal lines which is covered by only one of said tabular conductors with said main circuit current flowing therein, is constituted of selected one of a twisted wire and a shielded wire.

13. A power converter comprising:
a semiconductor circuit including first and second semiconductor switching devices each having a main terminal and a control terminal and electrically connected in parallel to each other, and third and fourth semiconductor switching devices each having a main terminal and a control terminal and electrically connected in parallel to each other, said first parallel circuit including said first and second semiconductor switching devices and said second parallel circuit including said third and fourth semiconductor switching devices being electrically connected in series to each other;
a main circuit wiring including a plurality of tabular conductors arranged at least in partially superposed relation to each other, a main circuit current of said semiconductor circuit flowing in said main circuit wiring; and first, second, third and fourth control signal lines for supplying a control signal to said control terminals of said first, second, third and fourth semiconductor switching devices, respectively;

wherein the length of that portion of each of said first and second control signal lines which is in opposite relation to an area of said main circuit wiring where said main circuit current flows and said plurality of said tabular conductors are in superposed relation with each other, is substantially equal to the total length of the corresponding one of said first and second control signal lines; and wherein the sum of the length of that portion of each of said third and fourth control signal lines which is in opposite relation to an area of said main circuit wiring where said main circuit current does not flow and the length of that portion of the corresponding one of said third and fourth control signal lines which is located outside an end of said main circuit wiring, is substantially equal to the total length of said corresponding one of said third and fourth control signal lines.

14. A power converter comprising:

a semiconductor circuit including a semiconductor switching device having a main terminal and a control terminal;

a main circuit wiring including a plurality of tabular conductors arranged at least in partially superposed relation to each other, the main circuit current of said semiconductor circuit flowing in said main circuit wiring; and a control signal line for supplying a control signal to said control terminal of said semiconductor switching device;

wherein the sum of the length of that portion of said control signal line which is in opposite relation to an area of said main circuit wiring where said main circuit current flows and where said plurality of said tabular conductors are in superposed relation with each other, the length of that portion of said control signal line which is in opposite relation to an area of said main circuit wiring where said main circuit current does not flow, and the length of that portion of said control signal line which is located outside an end of said main circuit wiring, is substantially equal to the total wiring length of said control signal line, and wherein that portion of said control signal line which is in opposite relation to only one of said tabular conductors in which said main circuit current flows, is formed of selected one of a twisted wire and a shielded wire.

15. A power converter comprising:

a semiconductor circuit including a semiconductor switching device having a main terminal and a control terminal;

a main circuit wiring including a plurality of tabular conductors arranged at least in partially superposed relation to each other, the main circuit current of said semiconductor circuit flowing in said main circuit wiring; and a control signal line for supplying a control signal to said control terminal of said semiconductor switching device;

wherein each junction between said control signal line and the circuit portion of said semiconductor circuit is covered by selected one of an area of said main circuit wiring where said main circuit current flows and said plurality of said tabular conductors are in superposed relation with each other and an area of said main circuit wiring where said main circuit current does not flow, said junction being alternatively located outside an end of said main circuit wiring, and wherein the portion of said control signal line which is covered by only one of said tabular conductors in which the main circuit current flows, is formed of selected one of a twisted wire and a shielded wire.

16. A power converter according to claim 12, wherein said first semiconductor switching device and said second semiconductor switching device are connected in parallel or in series to each other.

17. A power converter according to claim 12, wherein the sum of the length of the portion of each of said first and second control signal lines which is in opposite relation to an area of said main circuit wiring where said main circuit current flows and where said plurality of said tabular conductors are in superposed relation with each other, the length of that portion of each of said first and second control signal lines which is in opposite relation to an area of said main circuit wiring where said main circuit current does not flow, and the length of that portion of each of said first and second control signal lines which is located outside an end of said main circuit wiring, is substantially equal to the total wiring length of each of said first and second control signal lines.

18. A power converter according to claim 15, wherein the sum of the length of the portion of said control signal line which is in opposite relation to an area of said main circuit wiring where said main circuit current flows and where said plurality of said tabular conductors are in superposed relation with each other, the length of that portion of said control signal line which is in opposite relation to an area of said main circuit wiring where said main circuit current does not flow, and the length of that portion of said control signal line which is located outside an end of said main circuit wiring, is substantially equal to the total wiring length of said control signal line.

* * * * *